US012587500B2

(12) United States Patent
Heranjal et al.

(10) Patent No.: US 12,587,500 B2
(45) Date of Patent: Mar. 24, 2026

(54) MULTI-TENANT VIRTUAL PRIVATE NETWORK ADDRESS TRANSLATION

(71) Applicant: Alkira, Inc., San Jose, CA (US)

(72) Inventors: Shreyas Heranjal, San Jose, CA (US); Robin James, Milpitas, CA (US)

(73) Assignee: ALKIRA, INC., San Jose, CA (US)

( * ) Notice: Subject to any disclaimer, the term of this patent is extended or adjusted under 35 U.S.C. 154(b) by 701 days.

(21) Appl. No.: 17/937,838

(22) Filed: Oct. 4, 2022

(65) Prior Publication Data

US 2023/0106234 A1 Apr. 6, 2023

Related U.S. Application Data

(60) Provisional application No. 63/251,990, filed on Oct. 4, 2021.

(51) Int. Cl.
| | |
|---|---|
| *H04L 61/25* | (2022.01) |
| *H04L 12/46* | (2006.01) |
| *H04L 61/2557* | (2022.01) |
| *H04L 61/2592* | (2022.01) |

(52) U.S. Cl.
CPC .......... *H04L 61/25* (2013.01); *H04L 61/2557* (2013.01); *H04L 61/2592* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 9,942,787 B1 * | 4/2018 | Tillotson | H04W 24/08 |
| 2013/0103834 A1 * | 4/2013 | Dzerve | H04L 67/10 |
| | | | 709/225 |
| 2015/0139028 A1 * | 5/2015 | Lei | H04L 45/54 |
| | | | 370/254 |
| 2017/0078248 A1 * | 3/2017 | Bian | H04L 63/20 |
| 2021/0029088 A1 * | 1/2021 | Mayya | H04L 49/35 |

* cited by examiner

*Primary Examiner* — Mohamed Ibrahim
(74) *Attorney, Agent, or Firm* — Vani Moodley, Esq

(57) ABSTRACT

What is disclosed is providing a multi-tenant virtual private network (VPN) to a plurality of tenants, wherein tenant VPNs are associated with respective private networks; identifying a first subnet that makes up a portion of a first private network associated with a first tenant of the plurality of tenants; translating the first subnet into a first multi-tenant VPN address translation (MT-NAT) subnet that is used as part of a first tenant VPN to extend the first private network across a public network; identifying a second subnet that makes up a portion of the first private network, that is not contiguous with the first subnet, and that has not been translated into the first MT-NAT; and translating the second subnet and a proper subnet of the first subnet into a second MT-NAT subnet without impacting subnet fragmentation of the first private network. Also disclosed are systems and methods for this.

20 Claims, 13 Drawing Sheets

100

Flow management with
services (consistent hashing)

Branch Network
106

VPC
112

Computer-Readable Medium
102

B-Node
104

S-Nodes
108

V-Node
110

CXP
114

Consistent Hashing
Engine
118

Service
116-1

• • •

Service
116-n

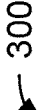
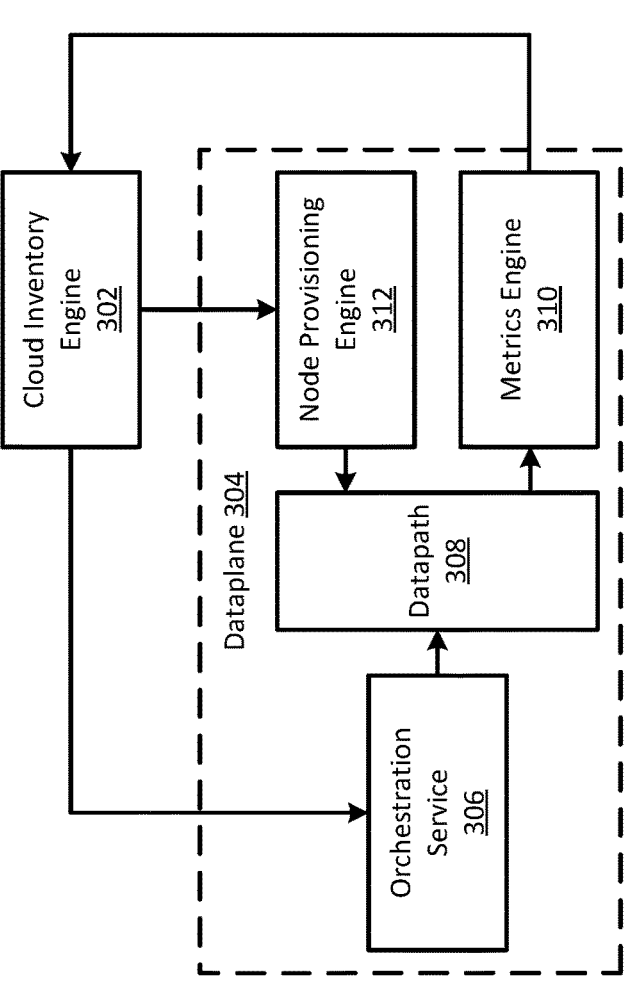
FIG. 3

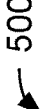
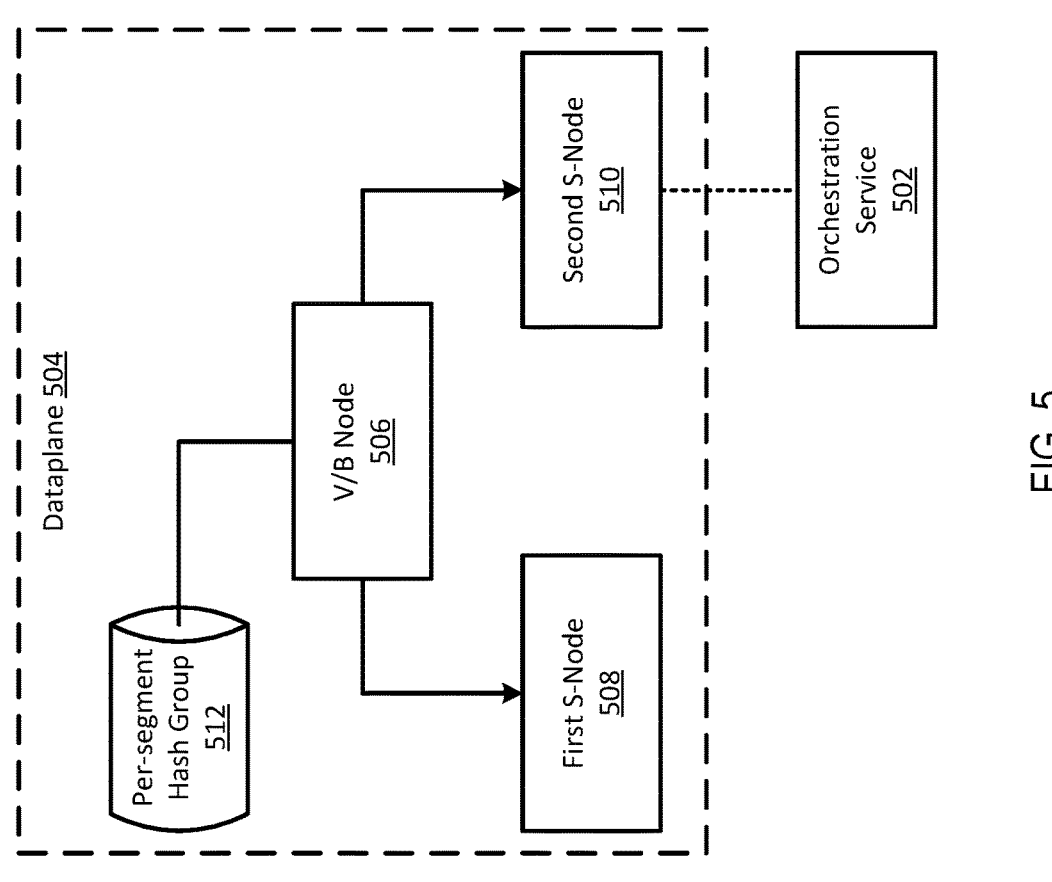
FIG. 5

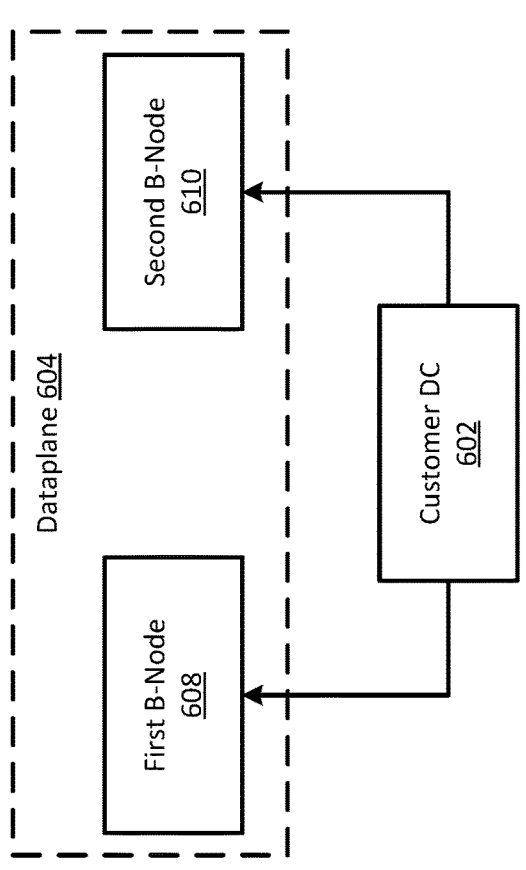
FIG. 6

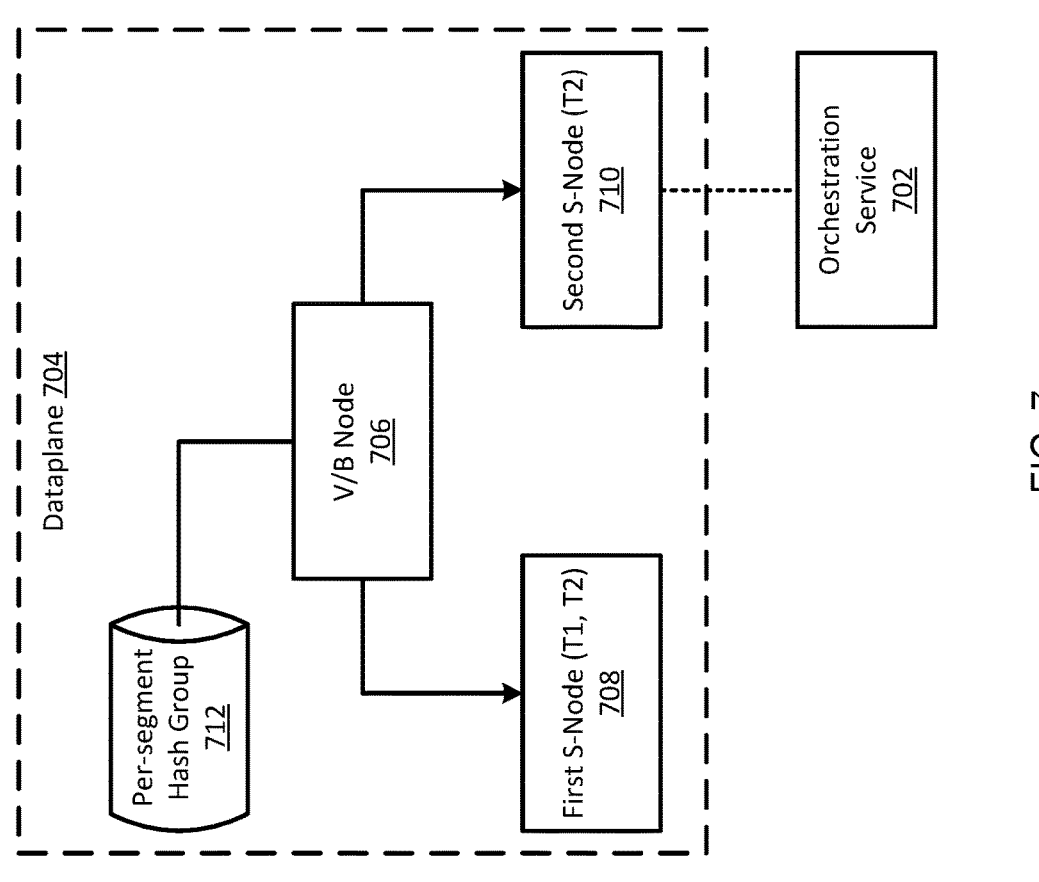
FIG. 7

900

MT-NAT User
Interface Engine
910

Destination System
908-1

• • •

Destination System
908-N

MT-NAT Subnet
Datastore
914

Non-Contiguous
Subnets
912

Multi-Tenant Virtual Private
Network(s) 902

MT-NAT Engine 904

Source System
906-1

• • •

Source System
906-N

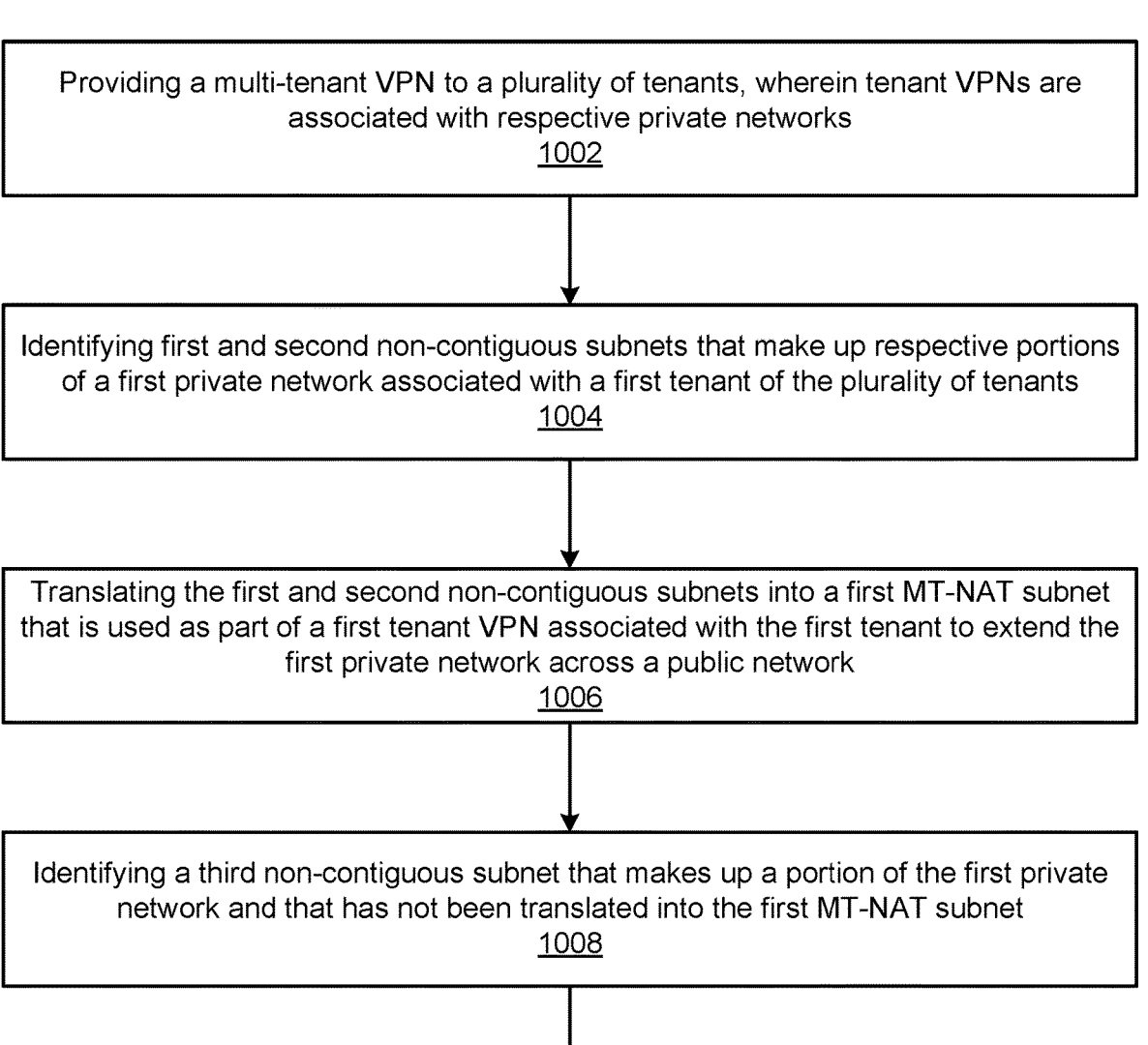

1000

Providing a multi-tenant VPN to a plurality of tenants, wherein tenant VPNs are associated with respective private networks
1002

Identifying first and second non-contiguous subnets that make up respective portions of a first private network associated with a first tenant of the plurality of tenants
1004

Translating the first and second non-contiguous subnets into a first MT-NAT subnet that is used as part of a first tenant VPN associated with the first tenant to extend the first private network across a public network
1006

Identifying a third non-contiguous subnet that makes up a portion of the first private network and that has not been translated into the first MT-NAT subnet
1008

Translating the first non-contiguous subnet and the third non-contiguous subnet, but not the second non-contiguous subnet, into a second MT-NAT subnet without impacting subnet fragmentation of the first private network
1010

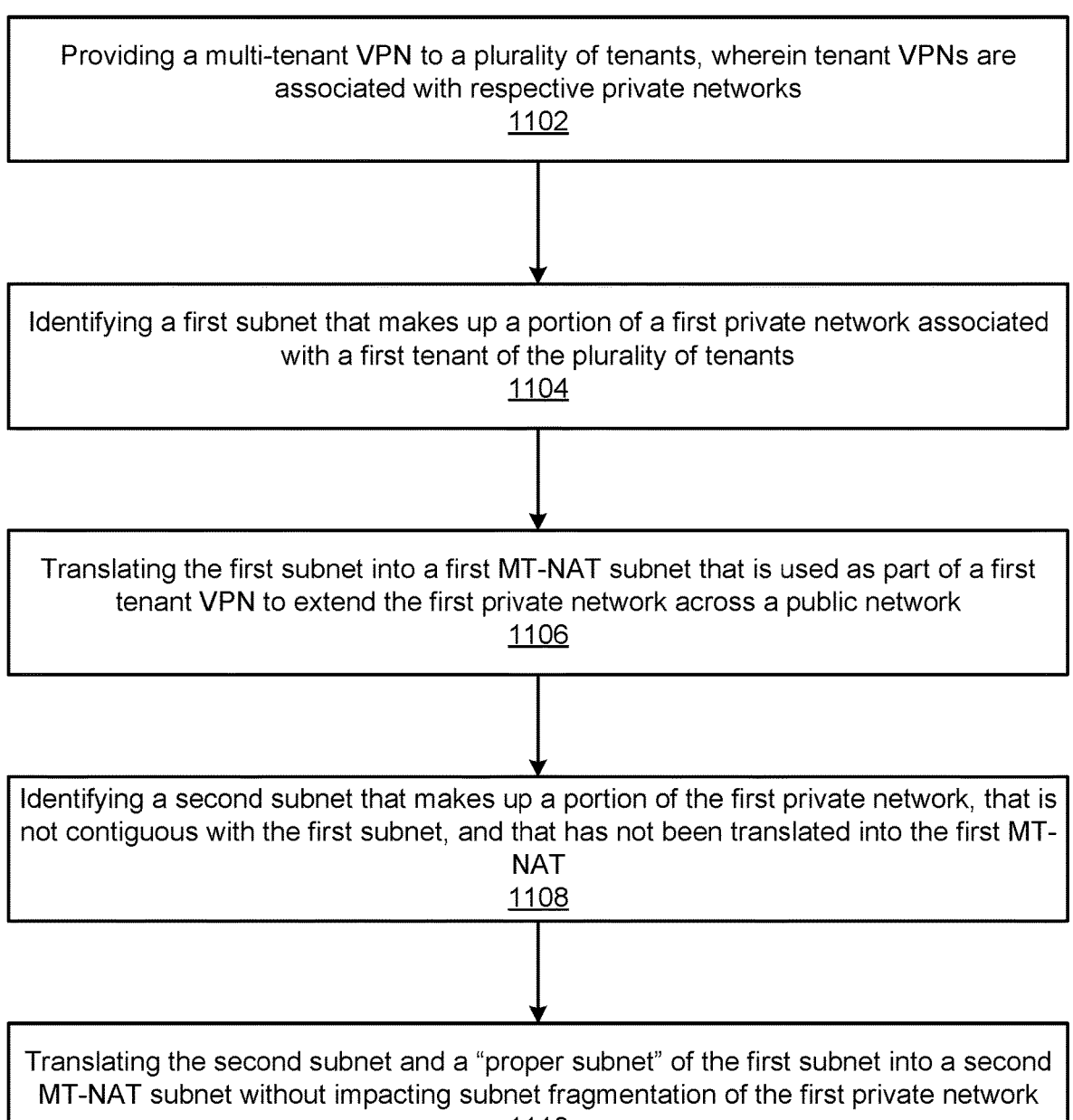

Providing a multi-tenant VPN to a plurality of tenants, wherein tenant VPNs are associated with respective private networks
1102

Identifying a first subnet that makes up a portion of a first private network associated with a first tenant of the plurality of tenants
1104

Translating the first subnet into a first MT-NAT subnet that is used as part of a first tenant VPN to extend the first private network across a public network
1106

Identifying a second subnet that makes up a portion of the first private network, that is not contiguous with the first subnet, and that has not been translated into the first MT-NAT
1108

Translating the second subnet and a "proper subnet" of the first subnet into a second MT-NAT subnet without impacting subnet fragmentation of the first private network
1110

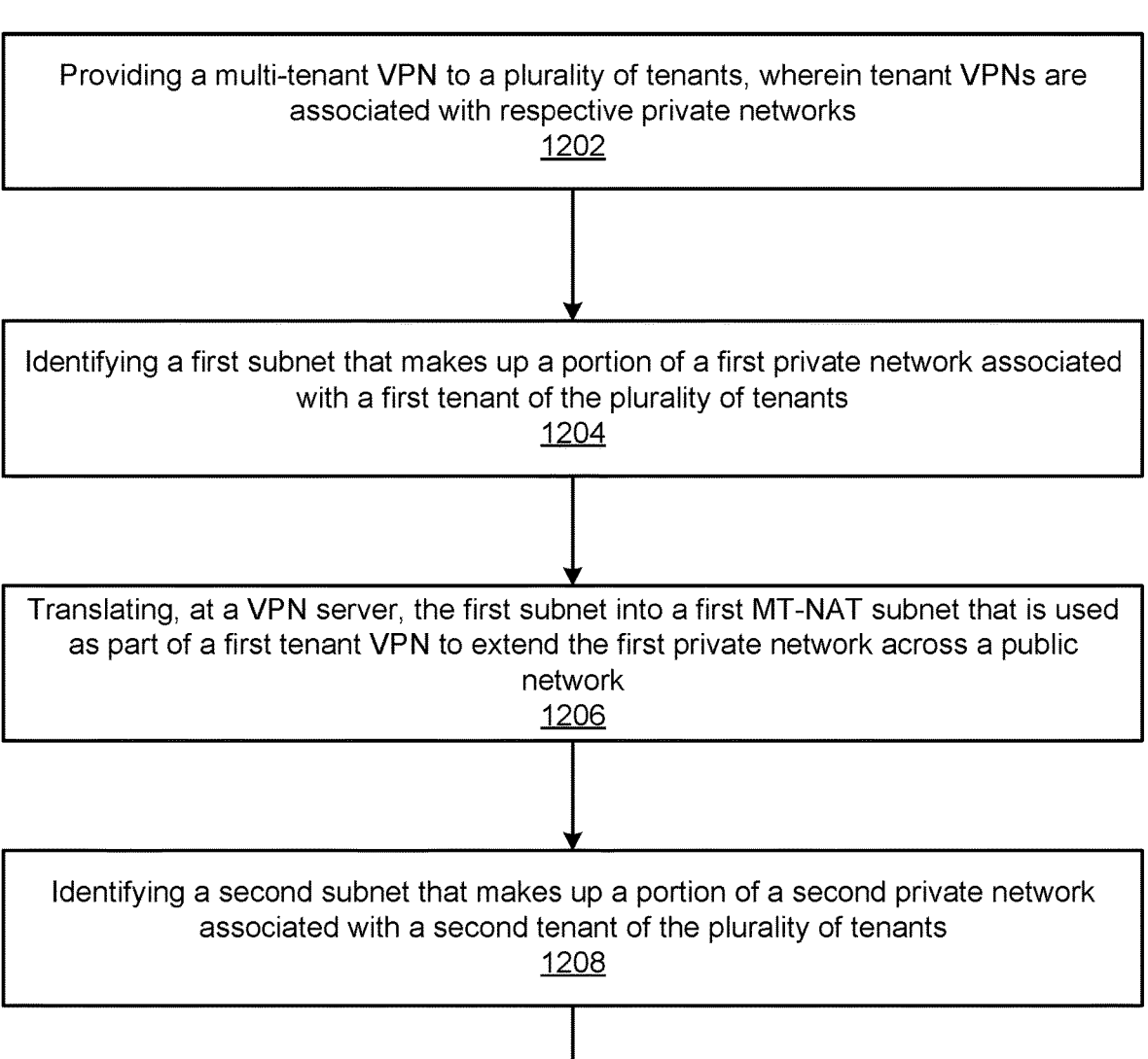

Providing a multi-tenant VPN to a plurality of tenants, wherein tenant VPNs are associated with respective private networks
1202

Identifying a first subnet that makes up a portion of a first private network associated with a first tenant of the plurality of tenants
1204

Translating, at a VPN server, the first subnet into a first MT-NAT subnet that is used as part of a first tenant VPN to extend the first private network across a public network
1206

Identifying a second subnet that makes up a portion of a second private network associated with a second tenant of the plurality of tenants
1208

Translating, at the VPN server, the second subnet into a second MT-NAT subnet that is used as part of a second tenant VPN to extend the second private network across the public network without impacting subnet fragmentation of the first or second private network
1210

FIG. 12

MULTI-TENANT VIRTUAL PRIVATE NETWORK ADDRESS TRANSLATION

CROSS REFERENCE TO RELATED APPLICATIONS

The present application claims benefit of U.S. Provisional Patent Application Ser. No. 63/251,990, entitled "MULTI-TENANT VIRTUAL PRIVATE NETWORK ADDRESS TRANSLATION," and filed on Oct. 4, 2021, which is hereby incorporated by reference herein.

BACKGROUND

A common problem for administrators is network fragmentation when assigning subnets. The problem arises when subnets are assigned in sequence, then are changed to another subnet assignment configuration. Groups of contiguous subnets become increasingly difficult to find as a network goes through its normal aging process.

BRIEF DESCRIPTION OF THE DRAWINGS

FIG. 3 is a diagram of a system with rapid node provisioning.

FIG. 5 is a diagram of an S-node autoscaling system.

FIG. 6 is a diagram of a connector autoscaling system.

FIG. 7 is a diagram of a tenant autoscaling system.

FIGS. 10, 11, and 12 are flowcharts of examples of a method of forming MT-NAT subnet(s) within a multi-tenant VPN.

DETAILED DESCRIPTION

Figure 1:
FIG. 1 is a diagram of a system that scales infrastructure as flows increase or decrease.

FIG. 1 is a diagram 100 of a system that scales infrastructure as flows increase or decrease. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, and a virtual private cloud (VPC) 112 coupled to the V-Node 110 through the CRM 102. In the diagram 100, a cloud services exchange platform (CXP) 114 includes the B-node 104, the S-nodes 108, the V-node 110, a service engine 116-1 to a service engine 116-n (collectively, the services 116) coupled to the S-nodes 108, and a consistent hashing engine 118 coupled to the B-node 104.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The consistent hashing engine 118 is intended to represent an engine that computes an S-Node index using a function Consistent_Hash (S1, . . . , Sn). In a specific implementation, the CXP 114 has a stateful elastic service plane that is highly redundant and scales horizontally. Thus, the CXP 114 can host stateful services and scale the services horizontally. Stateful services expect forward and reverse traffic of a flow to map to the same service node. Consistent hashing (e.g., google maglev) with flow learning (e.g., AcHash) can be used to meet the packet steering requirements. Ingress and egress nodes compute (via the consistent hashing engine 118) symmetric hash and arrive at the same service plane node for a given flow. Advantageously, addition or removal (including failure) of nodes has minimal impact on existing flows.

In a specific implementation, the consistent hashing engine 118 computes an S-Node index for traffic from branch ("forward flow") and the B-Node 104 steers traffic to a first S-Node of the S-Nodes 108 as described with reference to FIG. 2. In an L3 context a number of hashes equal to the number of S-nodes can be computed for a flow using a 5-tuple from fields in the header of a packet: {source IP address ("src-ip"), destination IP address ("dst-ip"), source port ("src-port"), destination port ("dst-port"), protocol}. Similarly, the consistent hashing engine 118 computes an S-Node index for traffic from cloud ("reverse flow") using symmetric hash and the V-node 110 steers traffic to the first S-Node of the S-Nodes 108 as described with reference to FIG. 2. For example, a symmetric hash can order IP addresses and ports by sorting, so the forward and reverse packets for a flow arrive at the same hash. S-Nodes 108 can use the same technique for steering traffic to firewalls and/or other stateful functions.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

Figure 2:
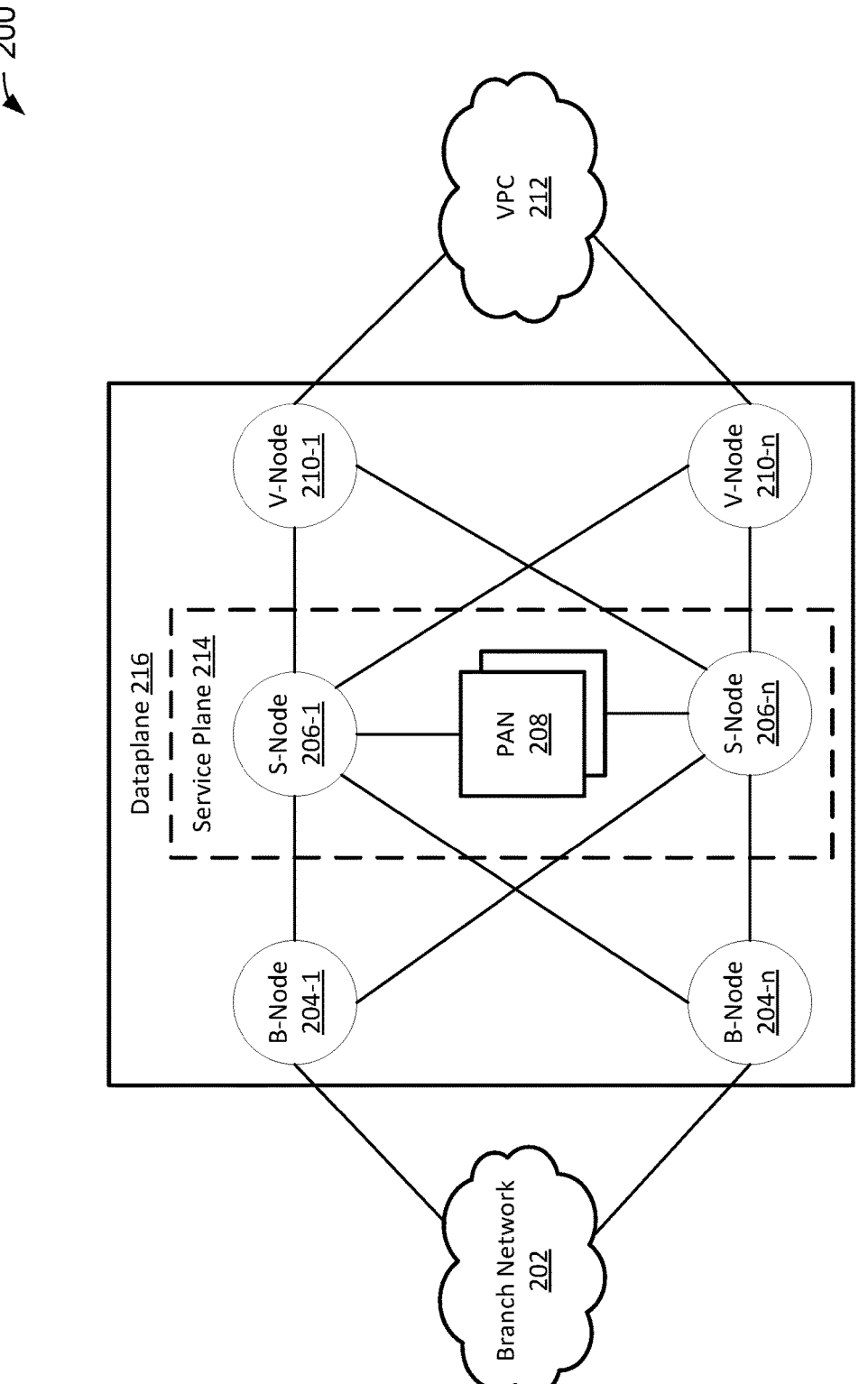
FIG. 2 is a diagram illustrating forward and reverse flows.

FIG. 2 is a diagram 200 illustrating forward and reverse flows. The diagram 200 includes a branch network 202, a B-node 204-1 to a B-node 204-n (collectively, the B-nodes 204) coupled to the branch network 202, an S-node 206-1 to an S-node 206-n (collectively, the S-nodes 206) coupled to the B-nodes 204, processing area networks (PANs) 208 coupled to the S-nodes 206, a V-node 210-1 to a V-node 210-n (collectively, the V-nodes 210) coupled to the S-nodes 206, and a VPC 212 coupled to the V-nodes 210. It may be noted that 'n' may or may not be indicative of the same number of each type of illustrated node.

The branch network 202 is similar to the branch network 104 of FIG. 1 and the VPC 212 is similar to the VPC 112 of FIG. 1. The S-nodes 206 and the PANs 208 can be referred to as a service plane 214. The B-nodes 204, service plane 214, and V-nodes 210 can be referred to as a dataplane 216. As illustrated in the diagram 200, the dataplane 216 operationally connects the branch network 202 to the VPC 212 with multiple sets of nodes. An example of a data plane 216 is an ALKIRA CLOUD SERVICE NODE (CSN)™ dataplane, which is a collection of nodes that moves customer traffic between connectors and through various service functions using a series of overlay tunnels. In a specific implementation, the dataplane 216 is multi-path but supports application identification, stateful policy, and service steering which are stateful functions. The fundamental challenge with multi-path and stateful processing is that the forward and reverse flow of a connection can land in different nodes causing the functionality to break. Accordingly, in the example of FIG. 2, multiple nodes are illustrated.

The B-nodes 204 are intended to represent a collection of engines, including traffic handling engines from connectors to and from the branch network 202. The S-nodes 206 are intended to represent a collection of engines, including engines for executing stateful functions and service steering. The V-nodes 210 are intended to represent a collection of engines, including traffic handling engines from connectors to and from the VPC 212. Each type of node can be independently scaled for resiliency reasons and/or to achieve higher scale, as is described later.

In an example of operation, a forward flow from a source in the branch network 202 (e.g., originating at a client behind an SDWAN) to a destination (e.g., a server) in the VPC 212, for illustrative purposes, traverses the B-node 204-1, the S-node 206-1, and the V-node 210-1. In addition, the forward flow can be characterized as passing from the S-node 206-1 to the PANs 208 and back to the S-node 206-1 before passing to the V-node 210-1.

In this example of operation, a stateful processing reverse flow traverses the V-node 210-1, the S-node 206-1, and the B-node 204-1 when passing from what was the destination (e.g., the server) to what was the source (e.g., the client). In addition, the stateful reverse flow can be characterized as passing from the S-node 206-1 to the PANs 208 and back to the S-node 206-1 before passing to the B-node 204-1. In a specific implementation, stateful reverse flow is achieved by configuring a VB node (e.g., the B-node 204-1 and the V-node 210-1) with an identical set of S-nodes (e.g., the S-nodes 206). Advantageously, if B-node 204-1 goes down, another of the B-nodes 204 can use the hash to maintain flow identity in a stateless way, though flow identity (state) is still maintained on the service plane 214. It may be desirable for the B-nodes 204 to maintain state for efficiency, but there are multiple ingress nodes and a hit node can compute the hash in exactly the same way, making the maintenance of state at the B-nodes 204 optional, assuming an implementation in which the B-nodes 204 are just used for steering traffic.

A system with a stateful flow identity is capable of rapid S-node provisioning. FIG. 3 is a diagram 300 of a system with rapid node provisioning. The diagram 300 includes a cloud resource inventory system 302 and a dataplane 304 coupled to the cloud inventory system 302. The dataplane 304 includes an orchestration service 306 coupled to the cloud resource inventory system 302, a datapath 308 coupled to the orchestration service 306, a metrics engine 310 coupled to the datapath 308 and the cloud resource inventory system 302, and a node provisioning engine 312 coupled to the cloud resource inventory system 302 and the datapath 308.

The cloud resource inventory engine 302 is intended to represent a collection of engines including an application programming interface (API), a tenant provisioning system (TPS), a resource manager, a monitoring engine, and inventory. Inventory can include qualified instance types for various nodes (e.g., v/b nodes, S-nodes, PANs), dataplane limits by provider (e.g., AWS may provide 25 Gbps per VPC and/or other VPC limits), qualified versions/AMI images for 3$^{rd}$ party services (e.g., Cisco SDWAN/PAN), and defined constraints for nodes or instance type combinations (e.g., max tenants for an S-node or an oversubscription factor).

The orchestration system 306 is intended to represent a collection of engines including, for example, a capacity planning engine with tenant and connector limits used to dimension the dataplane 308 (leaving room for future growth) and a connector placement engine. In a specific implementation, the capacity planning engine facilitates short-term growth by generating an alert when a load threshold (e.g., 80% capacity) is reached to trigger rapid node provisioning. In a specific implementation, the capacity planning engine facilitates long-term growth by evaluating moving a tenant out to a new dataplane or stretch a dataplane across multiple VPCs. In a specific implementation, the connector placement engine takes advantage of connectors having a desired number of paths defined in inventory (each path modeled as an incoming tunnel to dataplane nodes) to enable a resource manager to pick a least loaded node for tunnel placement. Connectors can be stitched to V- or B-nodes as per desired paths and multiple paths from connectors to the dataplane 308 achieve desired redundancy levels and performance (e.g., via equal cost multipath (ECMP) routing). Tunnels from connectors can be rate limited at ingress and infra-node connectivity is a mesh that can be designed for high availability.

The datapath 308 is intended to represent multiple independently scalable components. In a specific implementation, autoscaling (up or down) of S-nodes has no impact on connectors but each S-node has an associated monetary value that depends upon an associated business model, both to a customer as a value add and to the dataplane provider as a service to the customer. In a specific implementation, autoscaling of V/B nodes or connectors has impact on customers as EIPs are hosted there; because connectors have two paths, one path can be moved to a new node along with EIPs. In a specific implementation, autoscaling tenants impacts S-nodes and PAN; tenants are stretched to new nodes as the tenant grows. In a specific implementation, PAN recommendation guidelines are used to trigger autoscaling of services.

The metrics engine 310 is intended to represent an engine that collects metrics for components of the datapath 308. In a specific implementation, metrics for S-nodes and PAN includes sessions, throughput, descriptor usage, and memory usage; metrics for V/B nodes include throughput; and metrics for connectors include bandwidth. Metrics are provided to the cloud resource inventory engine 302, which informs communications to the orchestration service 306.

The node provisioning engine 312 is intended to represent an engine that autoscales PAN, S-node, connector, tenant, or other components of the datapath 308. As describe previously, consistent hashing facilitates consistent flows (that is, new flows can go through a new S-node but old flows are directed through a specific S-node or redirected if the specific S-node goes down) and stateful service, providing advantages such as scaling infrastructure to match flow (without dropping packets or reducing the risk thereof) without a need to deploy maximum capacity, which is normally challenging with stateful service. Because spinning up a node takes time, it is frequently undesirable to wait for 100% capacity, so a system may be set to spin up a new node at, say, 60% capacity, business intelligence can be used to determine an ideal spin up threshold (e.g., by historical traffic patterns, time of day, day of week, holiday, or the like), or a customer can pay a premium to spin up a new node at a lower threshold than a non-premium customer, typically using a function of cost to the dataplane provider to lower the threshold. It may be noted that node provisioning can include unprovisioning nodes to shrink capacity, which may result in cessation of flows to certain S-nodes. A flow can terminate after a time (e.g., the flow might go away in 10 minutes) and it may be desirable to drop some flows, forcing a restart of the flow, but it is generally desirable to minimized the dropping of flows. Depending upon implementation-, configuration-, or preference-specific parameters, customers could prohibit the dropping of flows, though that would be at a cost to the dataplane provider, which would likely be passed on to the customer. In a specific implementation, one or more baseline S-nodes are up at all times and other S-nodes, which can be referred to as "incremental S-nodes," stay up at least 30 minutes; smaller increments have a cost and you generally don't want to react on spikes but this is balanced against more granularity being better to avoid wasting resources.

Figure 4:
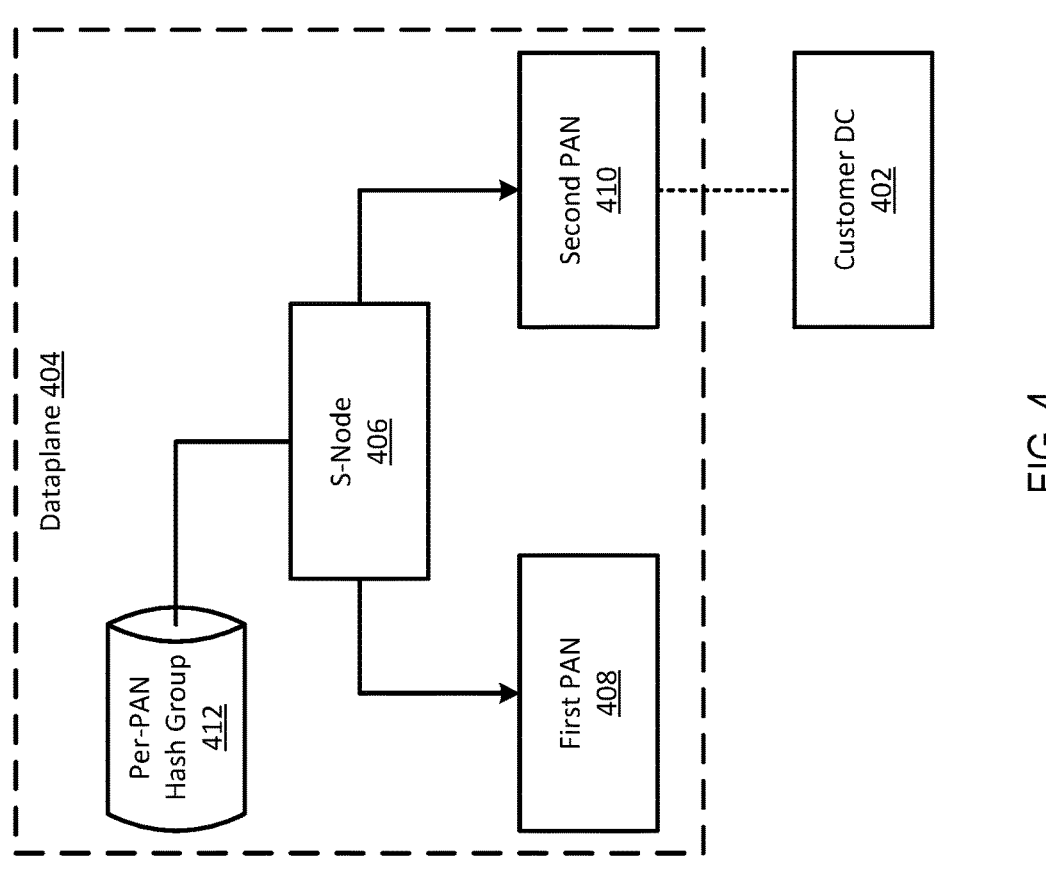
FIG. 4 is a diagram of a PAN autoscaling system.

FIG. 4 is a diagram 400 of a PAN autoscaling system. The diagram 400 includes a customer DC 402 and a dataplane 404 coupled to the customer DC 402. The dataplane 404 includes an S-node 406, a first PAN 408 coupled to the S-node 406, a second PAN 410 coupled to the S-node 406 and the customer DC 402, and a per-PAN hash group datastore 412 coupled to the S-node 406. For illustrative purposes, it is assumed the first PAN 408 is already instantiated, the per-PAN hash group datastore 412 includes a consistent hash for the first PAN 408, and the second PAN 410 is instantiated in the manner described in the following paragraph.

In order to autoscale PAN, the second PAN 410 is instantiated and configured to pull policy from the customer DC 402. The second PAN 410 is marked active after the policy download and the second PAN 410 is represented in the per-PAN hash group datastore 412, which maintains hash groups for PANs on S-nodes. Advantageously, autoscaling in this manner ensures existing flows are not adversely affected.

FIG. 5 is a diagram 500 of an S-node autoscaling system. The diagram 500 includes an orchestration service 502 and a dataplane 504 coupled to the orchestration service 502. The dataplane 504 includes a V/B node 506, a first S-node 508 coupled to the V/B node 506, a second S-node 510 coupled to the V/B node 506 and the orchestration service 502, and a per-segment hash group datastore 512 coupled to the V/B node 506. For illustrative purposes, it is assumed the first S-node 508 is already instantiated, the per-segment hash group datastore 512 includes a consistent hash for segments of the first S-node 508, and the second S-node 510 is instantiated in the manner described in the following paragraph.

In order to autoscale S-node, the second S-node 510 is instantiated, and tenant configuration and policies are configured from the orchestration service 502. The second S-node 510 is marked active after tenant and policy configuration and segments of the second S-node 510 are represented in the per-segment hash group datastore 512, which maintains hash groups for segments of the S-nodes on V/B nodes. Advantageously, autoscaling in this manner ensures existing flows are not adversely affected.

FIG. 6 is a diagram 600 of a connector autoscaling system. The diagram 600 includes a customer DC 602 and a dataplane 604 coupled to the customer DC 602. The dataplane 604 includes a first B-node 608 and a second B-node 610, both of which are coupled to the customer DC 602. Unlike autoscaling described in the previous figures, scale-out has been found to work poorly for connectors; scale-up works better. Connectors have multiple paths (tunnels) into the dataplane 604. Connector bandwidth can be monitored to scale up connectors.

FIG. 7 is a diagram 700 of a tenant autoscaling system. The diagram 700 includes an orchestration service 702 and a dataplane 704 coupled to the orchestration service 702. The dataplane 704 includes a V/B node 706, a first S-node 708 coupled to the V/B node 706, a second S-node 710 coupled to the V/B node 706 and the orchestration service 702, and a per-segment hash group datastore 712 coupled to the V/B node 706. For illustrative purposes, it is assumed the first S-node 708 is already instantiated for two tenants, T1 and T2, the per-segment hash group datastore 712 includes a consistent hash for segments of the first S-node 708, and the second S-node 710 is instantiated in the manner described in the following paragraph.

In order to autoscale tenants, the second S-node 710 is instantiated for the tenant T2, and tenant configuration and policies are configured from the orchestration service 702 for the tenant T2. In a specific implementation, the second S-node 710 can be an already instantiated S-node capable of handling incremental capacity associated with the tenant T2. The second S-node 710 is marked active after tenant and policy configuration and segments of the second S-node 710 are represented in the per-segment hash group datastore 712, which maintains hash groups for segments of the S-nodes that belong to a tenant on V/B nodes. Advantageously, autoscaling in this manner ensures existing flows are not adversely affected.

Figure 8:
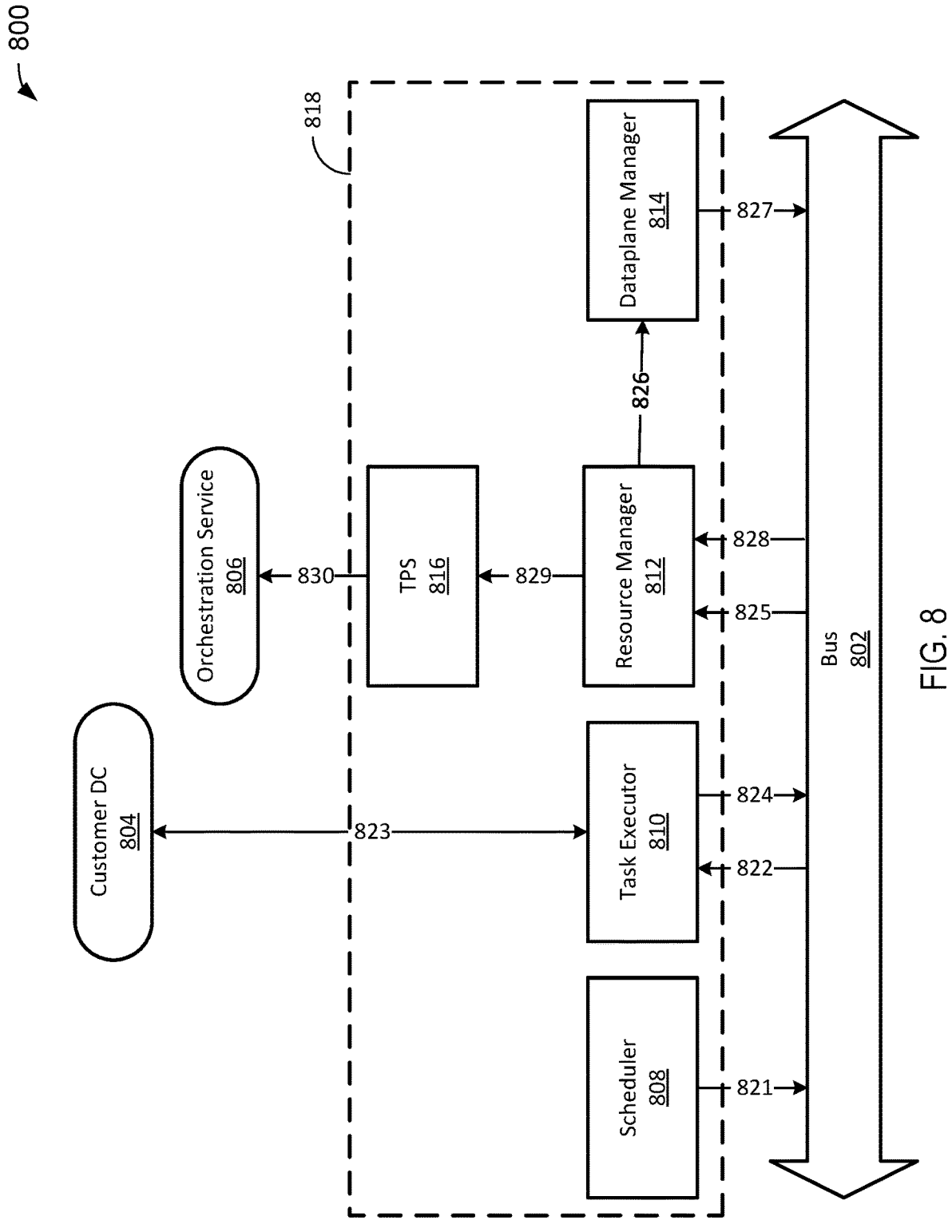
FIG. 8 is a diagram of a cloud inventory engine.

A cloud inventory engine, specifically the cloud inventory engine 302, was described with reference to FIG. 3. FIG. 8 is a diagram 800 of a cloud inventory engine. The diagram 800 includes a bus 802, a customer DC 804, and an orchestrator service 806 that may or may not be considered part of the cloud inventory engine (and the latter two are conceptually excluded in the example of FIG. 3). Included in the cloud inventory engine are a scheduler 808, a task executor 810, a resource manager 812, a dataplane manager 814, and a TPS 816, which are encompassed by the dashed box 818 for illustrative purposes. The arrows 821 to 830 represent the order of operations within (and to/from) the cloud inventory engine.

The scheduler 808 drops a task onto the bus 802, which, in a specific implementation, is a Kafka data bus, that is picked up by the task executor 810. The task executor 810 communicates with the customer DC 804 (e.g., an event monitoring and alerting engine, such as Prometheus) then drops a task onto the bus 802 that is picked up by the resource manager 812. The resource manager 812 provides information to the dataplane manager 814 that enables a decision regarding what task is needed on the dataplane and causes the dataplane manager 814 to drop a task onto the bus 802 to be picked up by the resource manager 812. The resource manager 812 provides information to the TPS 814, which communicates with the orchestration service 816 (which then takes relevant action on the dataplane).

Figure 9:
FIG. 9 is a diagram of a system for multi-tenant virtual private network (VPN) address translation.

FIG. 9 is a diagram 900 of a system for multi-tenant virtual private network (VPN) address translation. The diagram 900 includes a multi-tenant VPN 902, a multi-tenant VPN address translation (MT-NAT) engine 904 coupled to the multi-tenant VPN 902, source systems 906-1 to 906-N (individually, the source system 906, collectively, the source systems 906) coupled to the multi-tenant VPN 902, destination systems 908-1 to 908-N (individually, the destination system 908, collectively, the destination systems 908) coupled to the multi-tenant VPN 902, an MT-NAT user interface engine 910 coupled to the multi-tenant VPN 902, non-contiguous subnets 912 coupled to the multi-tenant VPN 902, and an MT-NAT subnet datastore 914 coupled to the multi-tenant VPN 902.

The multi-tenant VPN 902 is intended to represent one or more virtual private networks including and/or supporting multi-tenant architectures. For example, a tenant can be a group of one or more users or systems who can share access to a single instance of a system or a single instance of an application executing on a system. In one example, a tenant can be a customer (or a customer's representative) or a group of customers (or customer representatives).

In a specific implementation, the multi-tenant VPN 902 can include a plurality of access points and/or multiple subsets of access points. In one example, the multi-tenant VPN comprises a plurality of distinct VPNs, and each of the distinct VPNs can be associated with a particular tenant of the multi-tenant architecture. It will be appreciated that, in some embodiments, reference to a multi-tenant VPN can refer to the entire multi-tenant VPN 902 and/or portions thereof (e.g., one or more VPNs of the multi-tenant VPN 902). For illustrative convenience, it is assumed each tenant of a multi-tenant VPN is associated with a separate and distinct private network (the "tenant network").

The MT-NAT engine 904 is intended to represent an engine that provides, supports, and/or otherwise facilitates network address translation (e.g., of the multi-tenant VPN 902). In a specific implementation, the MT-NAT engine 904 is implemented in a scalable VPN server to which users can connect from a computing device coupled to the multi-tenant VPN 902 (e.g., via the Internet). The VPN server may or may not be hosted as a service by a cloud service provider.

It will be appreciated that MT-NAT is different from mere NAT. For example, NAT cannot typically be performed within the context of a VPN for large network address blocks (e.g., /16) because subnets are usually fragmented, let alone multi-tenant VPNs because it is generally impossible for an administrator to carve out large discrete blocks of addresses. In general, the number of available hosts on a subnet is $2^h-2$, where h is the number of bits used for the host portion of the address and the number of available subnets is $2^n$, where n is the number of bits used for the network portion of the address. As h increases, the odds of being able to allocate a subnet diminish in practice. The systems and methods described herein provide a technological improvement relative to other networking architectures and/or networking systems because of the ability to translate non-contiguous subnets to an MT-NAT subnet. In an alternative, the MT-NAT engine 904 is implemented in a multi-segmented remote VPN server as a service.

Advantageously, the VPN server is both multi-tenant and multi-segment, which makes it possible to implement the MT-NAT engine 904 as a multi-segment MT-NAT engine. This also allows a Software as a Service (SaaS) vendor to provide a cost-effective segmented and multi-tenant VPN solution. For example, a single VPN server can be provided for all tenants, reducing cost for a SaaS provider. Also, subnets can be dynamically allocated per tenant and per segment and segmentation can be based on user credentials, making it unnecessary to maintain separate servers for different segments.

In a specific implementation, the MT-NAT engine 904 is implemented on a VPN server that acts as a gateway to connect to any enterprise application. Users can connect to geo-redundant VPN servers based on lowest latency or other considerations. Traffic from the VPN server can also be taken through a firewall of other services, like load-balancers. Advantageously, secure access to the enterprise applications/resources via VPN is maintained.

In a specific implementation, the MT-NAT engine 904 and/or the multi-tenant VPN 902 is software-based (e.g., as opposed to hardware-based). In a software-based implementation, the system can achieve improved flexibility relative to traditional networking. For example, the MT-NAT engine 904 can allow administrators to control the multi-tenant VPN 902 (e.g., via the MT-NAT user interface engine 910), change configuration settings (e.g., via the MT-NAT user interface engine 910), provision resources (e.g., via the MT-NAT user interface engine 910), assign network addresses (e.g., IP addresses, IP prefixes) and/or subnets for flows and/or users (e.g., via the MT-NAT user interface engine 910), and increase network capacity (e.g., via the MT-NAT user interface engine 910).

It will be appreciated, depending upon implementation-, configuration-, or preference-specific factors, that the MT-NAT engine 904 can be configured to perform the functions described herein within one or more VPNs, other types of private networks, multi-tenant networks, and/or the like. Accordingly, for example, the MT-NAT engine 904 can function to perform operations in parallel across one or more VPNs. For example, operations executed with respect a particular tenant and/or a particular flow (e.g., in a particular VPN of the multi-tenant VPN 902) can be performed in parallel with operations executed with respect to another tenant and/or another flow (e.g., in another VPN of the multi-tenant VPN 902).

In a specific implementation, the MT-NAT engine 904 can function to provide a fragmentation-free subnet creation and deletion. For example, the MT-NAT engine 904 can create and then destroy an MT-NAT /17 without fragmenting a parent /16. As used in this paper, a "parent" subnet is one that encompasses a smaller subnet and a "child" subnet is one that is encompassed by a parent subnet.

In a specific implementation, the MT-NAT engine 904 can function to provide MT-NAT blocks of (contiguous) addresses, even /16, to an administrator of a tenant network. It may be possible for an administrator to identify, say, an unfragmented /24, but an unfragmented /16 is often unavailable in practice. The MT-NAT engine 904 can take 256/24's and combine them into what appears (to the administrator) to be a /16. For example, say an administrator has two non-contiguous subnets. The MT-NAT engine 904 combines the two non-contiguous subnets and makes traffic from the two non-contiguous subnets appear as child subnets that come from a parent MT-NAT. For example, the child subnets could be non-contiguous /24's and the parent MT-NAT could be a /23. Similarly, the administrator could provide four non-contiguous subnets that the MT-NAT engine 904 combines into a parent MT-NAT subnet, where the four non-contiguous subnets are /25's and the parent MT-NAT subnet is a /23. As another example, an administrator could provide a list of 50 k users and they could be combined into an MT-NAT /16. Advantageously, the MT-NAT engine 904 can provide an MT-NAT block of an applicable size and regardless of client-side fragmentation of subnets, translating whatever non-contiguous subnets available to child MT-NAT subnets.

In a specific implementation, the MT-NAT engine 904 can function to generate, transmit, and/or receive notifications. For example, the MT-NAT engine 904 can provide a resource prescription model and notify tenants, customers, and/or administrators of a need to spin up more resources to cover a desired number of users or subnets.

In a specific implementation, the MT-NAT engine 904 can function to spin-up and spin-down VPN resources (e.g., of the multi-tenant VPN 902). For example, the MT-NAT engine 904 can spin up more resources to cover a desired number of users or subnets that exceeds paid-for resources for a tenant.

The MT-NAT user interface engine 910 is intended to represent an engine that allows users (e.g., administrators, developers) to control and/or interface with the multi-tenant VPN 902, and systems and engines associated therewith (e.g., MT-VPN engine 904). More specifically, the MT-NAT user interface engine 910 can interact with other systems and engines (e.g., the MT-NAT engine 904) to provide an increased level of control relative to traditional network address translation controls (e.g., to ameliorate the problem of subnet fragmentation). In a specific implementation, the MT-NAT user interface engine 910 can allow users to control the multi-tenant VPN 902 (by interacting with the MT-NAT engine 904), assign contiguous network addresses, change configuration settings, define policies, provision resources, and increase network capacity. In a specific implementation, the MT-NAT user interface engine 910 provides a graphical user interface that allows users to interact with the MT-NAT engine 904 to perform some or all of the functions of the MT-NAT engine 904.

In the example of FIG. 9, in operation, a human or artificial agent of a tenant of the multi-tenant VPN 902 accesses the MT-NAT user interface engine 910 to provide the non-contiguous subnets 912 to the MT-NAT engine 904. It may be noted that child subnets are characterized as non-contiguous to illustrate that non-contiguous subnets can be translated into an MT-NAT subnet. Of course, a (contiguous) child subnet could also be translated into an MT-NAT subnet. The MT-NAT engine 904 then translates the non-contiguous subnets 912 into an MT-NAT subnet in the MT-NAT subnet datastore 914, which can be characterized as including additional information as would be expected for such an implementation, such as routing information. Using the MT-NAT subnet datastore 914, a VPN engine can extend a private network into a public network enabling a source system 906 that is part of the private network to send to a destination system 908 that is not part of the private network and enabling a destination system 908 that is part of the private network to receive from a source system 906 that is not part of the private network.

FIGS. 10, 11, and 12 are flowcharts 1000, 1100, and 1200 of examples of a method of forming MT-NAT subnet(s) within a multi-tenant VPN. In these and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

The flowchart 1000 starts at module 1002 with providing a multi-tenant VPN to a plurality of tenants, wherein tenant VPNs are associated with respective private networks. In a specific implementation, a VPN server provides an access point through which a private network is extended into a public network.

The flowchart 1000 continues to module 1004 with identifying first and second non-contiguous subnets that make up respective portions of a first private network associated with a first tenant of the plurality of tenants. Identification of the first and second non-contiguous subnets can be accomplished by a human or artificial agent of a tenant providing the first and second non-contiguous subnets to a VPN server via an MT-NAT user interface, such as a user interface provided by the MT-NAT user interface 910 of FIG. 9.

The flowchart 1000 continues to module 1006 with translating the first and second non-contiguous subnets into a first MT-NAT subnet that is used as part of a first tenant VPN associated with the first tenant to extend the first private network across a public network. The first and second non-contiguous subnets are characterized as "non-contiguous" to illustrate translating non-contiguous subnets into an MT-NAT subnet is possible. Of course, (contiguous) subnets can also be translated in this way. The translation can be performed by an MT-NAT engine, such as the MT-NAT engine 904 of FIG. 9. Not shown in this example is other information typically created, read, updated, and/or deleted in association with address translation and messages sent therewith.

The flowchart 1000 continues to module 1008 with identifying a third non-contiguous subnet that makes up a portion of the first private network and that has not been translated into the first MT-NAT subnet. Here, the third non-contiguous subnet is intended to be non-contiguous with the first non-contiguous subnet. Identification of the third non-contiguous subnet can be accomplished in a manner similar to that described above, but for the purpose of example, it may be mentioned that the third non-contiguous subnet could be identified from a datastore of previously-provided subnets. Indeed, the first, second, and third subnets could have been acquired at the same time, but the third subnet is only identified later as an intended component for an MT-NAT subnet.

The flowchart 1000 ends at module 1010 with translating the first non-contiguous subnet and the third non-contiguous subnet, but not the second non-contiguous subnet, into a second MT-NAT subnet without impacting subnet fragmentation of the first private network. Subnet fragmentation can occur when a subnet (e.g., the third non-contiguous subnet) is taken from a larger subnet (e.g., the third subnet could be a /25 and a /22 that includes the third subnet could be available for allocation, but the entire /22 is not needed). Because the system can utilize other portions of a parent of the third non-contiguous subnet, the first private network is not impacted by subnet fragmentation.

The flowchart 1100 starts at module 1102 with providing a multi-tenant VPN to a plurality of tenants, wherein tenant VPNs are associated with respective private networks. In a specific implementation, a VPN server provides an access point through which a private network is extended into a public network.

The flowchart 1100 continues to module 1104 with identifying a first subnet that makes up a portion of a first private network associated with a first tenant of the plurality of tenants. Identification can be accomplished as described above.

The flowchart 1100 continues to module 1106 with translating the first subnet into a first MT-NAT subnet that is used as part of a first tenant VPN to extend the first private network across a public network. Translation can be accomplished as described above.

The flowchart 1100 continues to module 1108 with identifying a second subnet that makes up a portion of the first private network, that is not contiguous with the first subnet, and that has not been translated into the first MT-NAT. Identification can be accomplished as described above.

The flowchart 1100 ends at module 1110 with translating the second subnet and a "proper subnet" of the first subnet into a second MT-NAT subnet without impacting subnet fragmentation of the first private network. Here, a "proper subnet" is intended to represent a subnet of the first subnet that does not comprise the entire first subnet. Typically, network address translation that uses only a portion of a larger subnet results in subnet fragmentation, but because the system can utilize other portions of the second subnet, the first private network is not impacted by subnet fragmentation.

The flowchart 1200 starts at module 1202 with providing a multi-tenant VPN to a plurality of tenants, wherein tenant VPNs are associated with respective private networks. In a specific implementation, a VPN server provides an access point through which a private network is extended into a public network.

The flowchart 1200 continues to module 1204 with identifying a first subnet that makes up a portion of a first private network associated with a first tenant of the plurality of tenants. Identification can be accomplished as described above.

The flowchart 1200 continues to module 1206 with translating, at a VPN server, the first subnet into a first MT-NAT subnet that is used as part of a first tenant VPN to extend the first private network across a public network. Translation can be accomplished as described above. However, here, a VPN server is referenced to illustrate the translation can occur at a VPN server that, as described below, also performs translation for a second private network.

The flowchart 1200 continues to module 1208 with identifying a second subnet that makes up a portion of a second private network associated with a second tenant of the plurality of tenants. Identification can be accomplished as described above.

The flowchart 1200 ends at module 1210 with translating, at the VPN server, the second subnet into a second MT-NAT subnet that is used as part of a second tenant VPN to extend the second private network across the public network without impacting subnet fragmentation of the first or second private network. As mentioned above, the translation into the first MT-NAT subnet and the second MT-NAT subnet occurs on the same VPN server.

Figure 13:
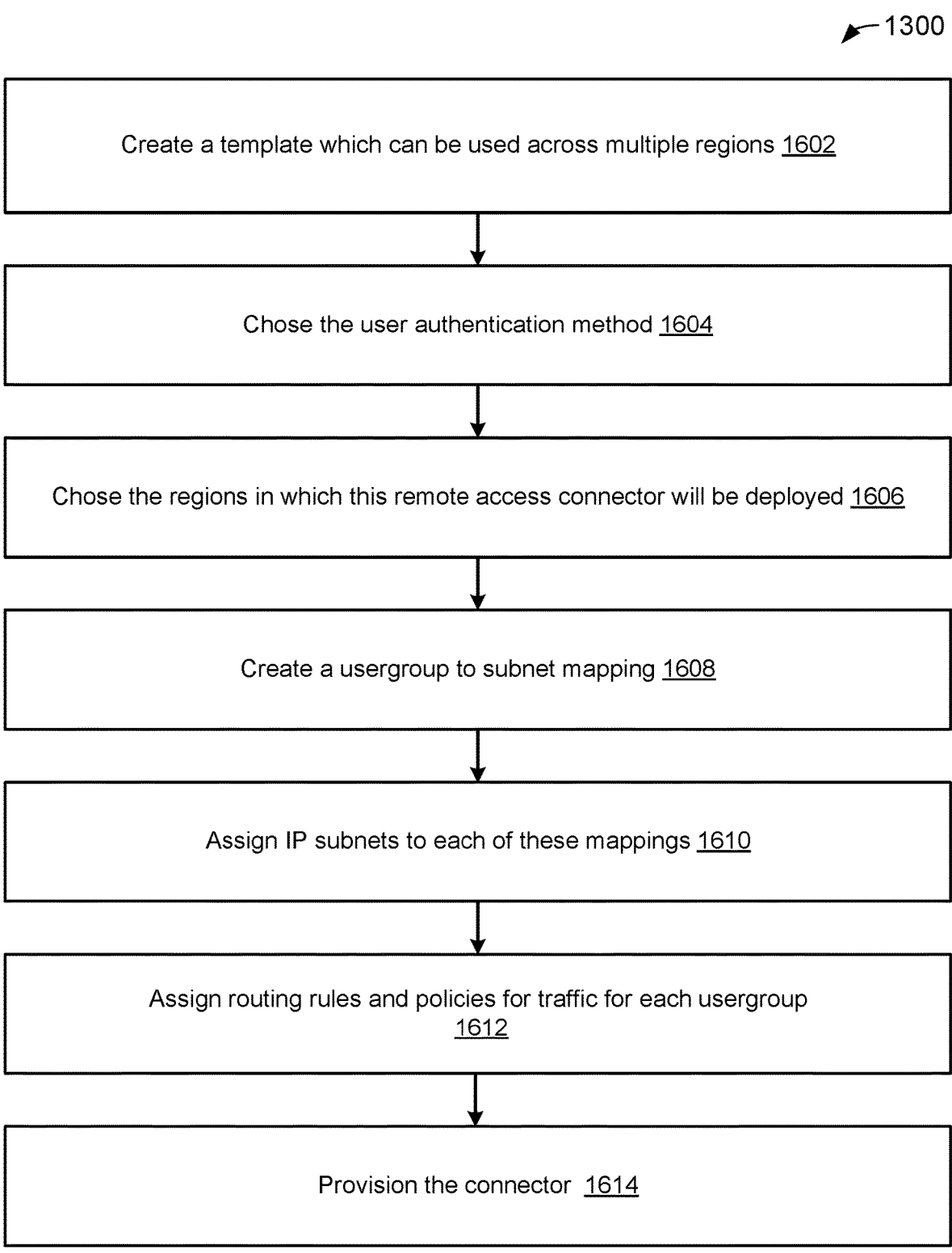
FIG. 13 is a flowchart of an example of a method of operation of a CXP.

FIG. 13 is a flowchart of an example of a method of operation of CXP. The flowchart 1300 starts at module 1302 with creating a template which can be used across multiple regions, continues to module 1304 with choosing a user authentication method, continues to module 1306 with choosing the region in which this remote access connector will be deployed, continues to module 1308 with creating a user group to subnet mapping, continues to module 1310 with assigning IP subnets to each of the mappings, continues to module 1312 with assigning routing rules and/or policies for traffic for each user group, and ends at module 1314 with provisioning the connector. These modules can be performed by a VPN server or CXP, such as the CXP 114 of FIG. 1.

What is claimed is:

1. A system comprising:
one or more processors; and
memory storing instructions that, when executed by the one or more processors, cause the system to perform:
    providing a multi-tenant virtual private network (VPN) to a plurality of tenants, wherein tenant VPNs are associated with respective private networks;
    identifying a first subnet that makes up a portion of a first private network associated with a first tenant of the plurality of tenants;
    translating the first subnet into a first multi-tenant VPN address translation (MT-NAT) subnet that is used as part of a first tenant VPN to extend the first private network across a public network;
    subsequently identifying a second subnet that makes up a portion of the first private network, wherein the second subnet is not contiguous with the first subnet, and has not been translated into the first MT-NAT subnet;
    extracting a proper subnet from the first subnet, wherein the proper subnet comprises less than all of the first subnet such that a remaining portion of the first subnet is excluded from the proper subnet;
    combining the proper subnet and the second subnet into a second MT-NAT subnet that is distinct from the first MT-NAT subnet;

translating addresses from the proper subnet and the second subnet into addresses within the second MT-NAT subnet; and
maintaining the remaining portion of the first subnet as available for allocation within the first private network to avoid subnet fragmentation of the first private network.

2. The system of claim 1, wherein the system comprises an MT-NAT engine for translating the first subnet and translating the second subnet.

3. The system of claim 2, wherein the MT-NAT engine is implemented on a VPN server.

4. The system of claim 2, wherein the MT-NAT engine is implemented on a branch node (B-node).

5. The system of claim 1, wherein the system comprises an MT-NAT user interface, wherein the first subnet is identifiable from a list of subnets provided by an agent of a tenant via the MT-NAT user interface.

6. The system of claim 5, wherein the first private network is part of a branch network.

7. The system of claim 1, wherein the system comprises an MT-NAT user interface, wherein the second subnet is identifiable from a list of subnets provided by an agent of a tenant via the MT-NAT user interface.

8. The system of claim 7, wherein the first private network is part of a branch network.

9. The system of claim 1, comprising instructions that cause the system to perform:
    creating a user group to subnet mapping;
    assigning subnets, including the first subnet and the second subnet, to each of these mappings;
    assigning routing rules and policies for traffic for each user group.

10. A method implemented by a computing system including one or more processors and storage media storing machine-readable instructions, wherein the method is performed using the one or more processors, the method comprising:
    providing a multi-tenant VPN to a plurality of tenants, wherein tenant VPNs are associated with respective private networks;
    identifying a first subnet that makes up a portion of a first private network associated with a first tenant of the plurality of tenants;
    translating the first subnet into a first MT-NAT subnet that is used as part of a first tenant VPN to extend the first private network across a public network;
    subsequently identifying a second subnet that makes up a portion of the first private network, wherein the second subnet is not contiguous with the first subnet, and has not been translated into the first MT-NAT subnet;
    extracting a proper subnet from the first subnet, wherein the proper subnet comprises less than all of the first subnet such that a remaining portion of the first subnet is excluded from the proper subnet;
    combining the proper subnet and the second subnet into a second MT-NAT subnet that is distinct from the first MT-NAT subnet;
    translating addresses from the proper subnet and the second subnet into addresses within the second MT-NAT subnet; and
    maintaining the remaining portion of the first subnet as available for allocation within the first private network to avoid subnet fragmentation of the first private network.

11. The method of claim 10, comprising using an MT-NAT engine for translating the first subnet and translating the second subnet.

12. The method of claim 11, wherein the MT-NAT engine is implemented on a VPN server.

13. The method of claim 11, wherein the MT-NAT engine is implemented on a branch node (B-node).

14. The method of claim 10, comprising providing an MT-NAT user interface through which the first subnet is received, wherein the first subnet is identifiable from a list of subnets provided by an agent of a tenant via the MT-NAT user interface.

15. The method of claim 14, wherein the first private network is part of a branch network.

16. The method of claim 10, comprising providing an MT-NAT user interface through which the second subnet is received, wherein the second subnet is identifiable from a list of subnets provided by an agent of a tenant via the MT-NAT user interface.

17. The method of claim 16, wherein the first private network is part of a branch network.

18. The method of claim 10, comprising:

creating a user group to subnet mapping;

assigning subnets, including the first subnet and the second subnet, to each of these mappings;

assigning routing rules and policies for traffic for each user group.

19. A system comprising:

a means for providing a multi-tenant VPN to a plurality of tenants, wherein tenant VPNs are associated with respective private networks;

a means for identifying a first subnet that makes up a portion of a first private network associated with a first tenant of the plurality of tenants;

a means for translating the first subnet into a first MT-NAT subnet that is used as part of a first tenant VPN to extend the first private network across a public network;

a means for subsequently identifying a second subnet that makes up a portion of the first private network, wherein the second subnet is not contiguous with the first subnet, and has not been translated into the first MT-NAT subnet;

a means for extracting a proper subnet from the first subnet, wherein the proper subnet comprises less than all of the first subnet such that a remaining portion of the first subnet is excluded from the proper subnet;

a means for combining the proper subnet and the second subnet into a second MT-NAT subnet that is distinct from the first MT-NAT subnet;

a means for translating addresses from the proper subnet and the second subnet into addresses within the second MT-NAT subnet; and a means for maintaining the remaining portion of the first subnet as available for allocation within the first private network to avoid subnet fragmentation of the first private network.

20. The system of claim 19, wherein the means for translating the first subnet and the means for translating the second subnet is implemented on a VPN server.

* * * * *